UNITED STATES PATENT OFFICE 1,949,204

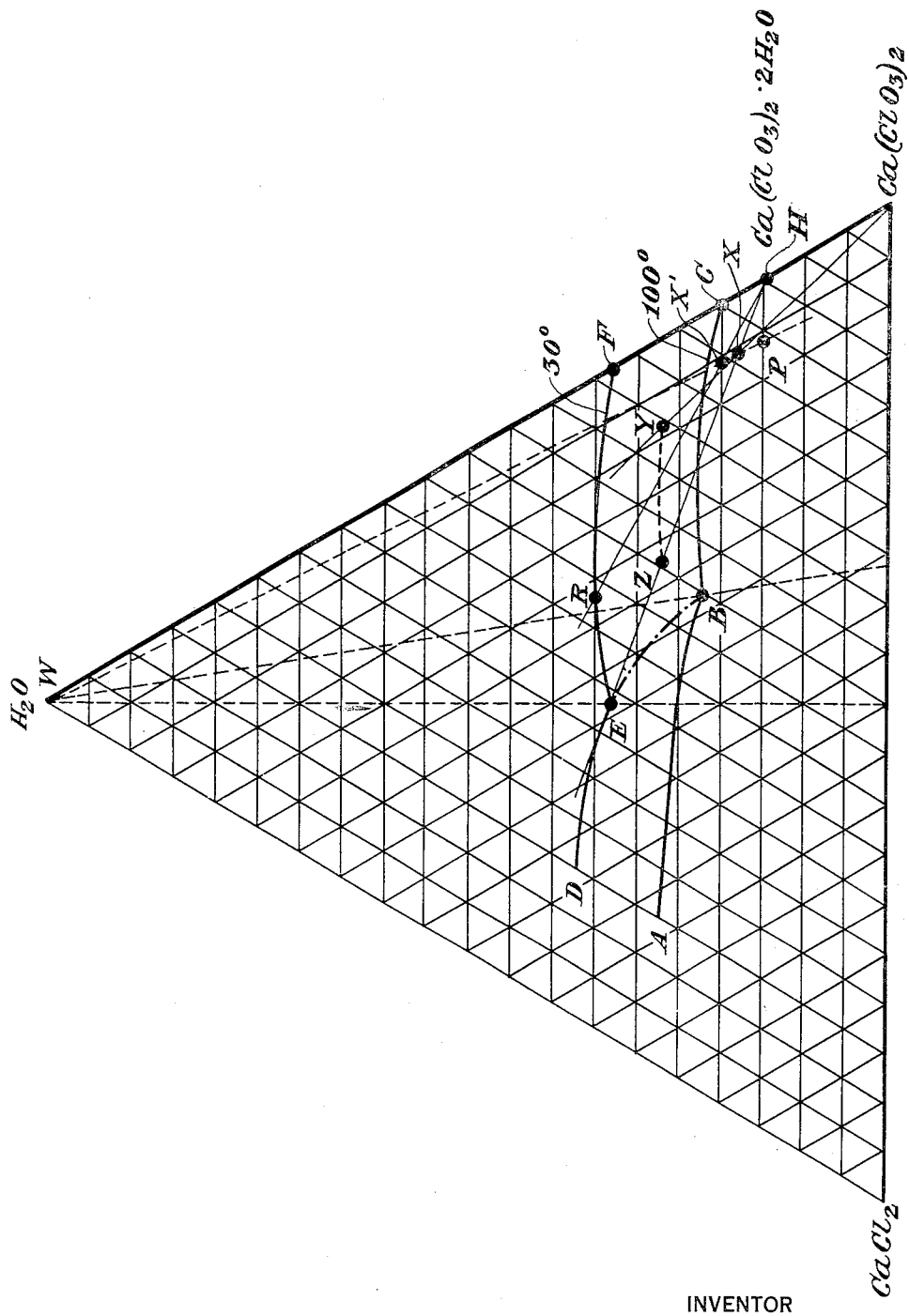

PURIFYING CALCIUM CHLORATE

Sheldon B. Heath, Midland, Mich., assignor to The Dow Chemical Company, Midland, Mich., a corporation of Michigan Application May 26, 1932. Serial No. 613,677

8 Claims. (Cl. 23—85)

The present invention relates to crystallization methods for purifying calcium chlorate from relatively small amounts of calcium chloride.

In my prior application, Serial No. 424,493, filed January 30, 1930, Patent No. 1,887,809 I have disclosed a process for making calcium chlorate which involves crystallizing the same as the dihydrated salt, $Ca(ClO_3)_2.2H_2O$, from an aqueous solution thereof containing calcium chloride in a molecular ratio relative to said chlorate greater than $$\frac{1}{1}.$$

The chlorate crystals so produced, when filtered from the mother liquor, contain normally about 4 to 6 per cent of calcium chloride as an impurity. It is desirable to provide a method for purifying the crude chlorate crystals from the accompanying chloride.

In another application, Serial No. 433,768, filed March 6, 1930, Patent No. 1,893,740 I have described a method of purification of the crude calcium chlorate crystals in which the same are recrystallized from water at a temperature above 60° C., whereby the anhydrous salt crystals are obtained. Such method is in some respects disadvantageous in that the recrystallization is effected from relatively concentrated solutions and it is difficult to separate adhering mother liquor from the crystals, while the filtration must be carried out with a hot crystal slurry, i. e. above 60° C., in order to obtain the anhydrous crystals.

It is an object of the present invention to provide a method of purifying the aforesaid crude calcium chlorate crystals by recrystallization which may be carried out with less concentrated solutions and at ordinary temperatures, the purified crystals being thus obtained in the dihydrated form. The present improved method is adapted generally for separating calcium chlorate by crystallization from mixtures thereof with calcium chloride in which the molecular ratio of $CaCl_2$ to $Ca(ClO_3)_2$ is less than $$\frac{1}{1}.$$

The invention, then, consists of the steps constituting my improved method which are hereinafter fully described and particularly pointed out in the claims, the annexed drawing and following description setting forth but a few of the various ways in which the principle of the invention may be used.

In said annexed drawing:—

The single figure is a chart showing solubility curves for mixed solutions of calcium chlorate and calcium chloride at temperatures of 30° and 100° C., respectively, plotted on a weight basis.

In the drawing, the curve ABC represents the solubilities of mixtures of calcium chlorate and calcium chloride at 100° C., while the curve DEF represents the solubilities at 30° C. These curves are selected as being illustrative of solubility relationships within a convenient temperature range for carrying out the method of the invention, but are not to be regarded as implying any limitation thereon.

Referring to curve ABC, section AB shows the solubility of mixtures saturated with respect to calcium chloride as the dihydrate, $CaCl_2.2H_2O$, and section BC that of mixtures saturated with respect to anhydrous calcium chlorate. The triple point B represents the equilibrium mixture of the three component system $CaCl_2.2H_2O$, $Ca(ClO_3)_2$ and $H_2O$. At point B the molecular ratio of $CaCl_2$ to $Ca(ClO_3)_2$ is very nearly $$\frac{1}{1}.$$

Similarly in the 30° curve DEF, section DE indicates mixtures saturated with respect to calcium chloride, while section EF shows the solubility of mixtures saturated with respect to calcium chlorate dihydrate, $Ca(ClO_3)_2.2H_2O$. Point E represents the equilibrium mixture saturated with respect to both solid phases, the molecular ratio of $CaCl_2$ to $Ca(ClO_3)_2$ being approximately $$\frac{2}{1}.$$

At intermediate temperatures the solubility curves would lie between the two curves shown. The dot-dash line curve BE indicates approximately the variation in equilibrium point at temperatures between 100° and 30° C. The transition temperature from $Ca(ClO_3)_2.2H_2O$ to anhydrous $Ca(ClO_3)_2$ is between 60° and 67° C., varying with the amount of $CaCl_2$ present, which depresses the transition point.

The solubility curves show that at 100° C. anhydrous $Ca(ClO_3)_2$ may be crystallized from solutions containing less than 1 mole of $CaCl_2$ per mole $Ca(ClO_3)_2$, but at 30° C. the dihydrate $Ca(ClO_3)_2.2H_2O$ may be crystallized from mixed solutions containing up to 2 moles $CaCl_2$ per mole $Ca(ClO_3)_2$.

The crude calcium chlorate crystals, produced according to the process of the prior application referred to, may have a composition approximately according to the following representative analysis:—

| | Per cent |
|---|---|
| $Ca(ClO_3)_2$ | 79.1 |
| $CaCl_2$ | 5.8 |
| $H_2O$ | 15.1 |

The composition of these crude crystals is represented on the drawing by point P.

In order to purify the crude crystals according to the method of the present invention, they are dissolved up in a small amount of water, preferably by warming, and recrystallized by cooling the solution to a suitable temperature below 60° C. The composition of the solution would be represented by some point on the line WP drawn from the $H_2O$ vertex of the chart through point P, the precise location being determined by the amount of water added. The point of intersection of the line WP with curve BC is the saturation point of the solution with respect to anhydrous $Ca(ClO_3)_2$ at 100° C., and the intersection with curve EF is the saturation point with respect to $Ca(ClO_3)_2.2H_2O$ at 30° C.

From the chart it is seen that the maximum degree of separation of $Ca(ClO_3)_2.2H_2O$ crystals from a solution containing $CaCl_2$ at 30° C. is obtained when the mother liquor has a composition represented by point E. By drawing a straight line from point H, which represents the composition of $Ca(ClO_3)_2.2H_2O$, to point E, the intersection of line EH with line WP at point X represents the composition of the solution of crude chlorate crystals which, upon cooling to 30° C., will yield the maximum amount of crystals of $Ca(ClO_3)_2.2H_2O$. This composition, as will be seen from the chart, is $Ca(ClO_3)_2$—76 per cent, $CaCl_2$—6 per cent, $H_2O$—18 per cent. Accordingly, the crude crystals may be dissolved in sufficient water to make a solution of composition represented by point X. Since this point is below curve BC, the solution must be heated above 100° C. sufficiently to effect complete solution of the crude crystals. Upon cooling the solution to 30° C., a quantity of $Ca(ClO_3)_2.2H_2O$ crystals will be obtained in a mother liquor of composition represented by point E, the proportions of crystals to mother liquor being as the length of line EX is to XH.

Since this procedure, however, would produce too thick a slurry of crystals and mother liquor to handle conveniently by usual means, if cooled directly to 30° C., the cooling may be conducted in two stages. That is to say, the hot mixture may be cooled to a temperature below 60° but somewhat above 30° C., the crystals separated, and the mother liquor cooled further to 30° C. to precipitate a second lot of crystals. The crude crystals may also be dissolved in a larger quantity of water to make a solution of composition represented, for example, by point X', which, when cooled to 30° C., as shown by a line drawn from H through X' intersecting curve EF at R, will give a mixture of $Ca(ClO_3)_2.2H_2O$ crystals in a mother liquor of composition R, i. e. $Ca(ClO_3)_2$—43.5 per cent, $CaCl_2$—21.5 per cent, $H_2O$—35 per cent, the proportion of crystals to mother liquor being as the length of X'R is to X'H. The mother liquor may then be evaporated further and cooled to produce another crop of crystals, if desired. In similar manner the crystallization of any solution represented by a point on line WP anywhere between point X and the intersection with curve EF may be illustrated, by drawing a line from point H through the point on line WP to intersect with curve EF.

As the hot solution is cooled, the first crystals precipitated will be the anhydrous form until the temperature falls to about 60° C. Thereafter the dihydrate crystals will be precipitated, while the anhydrous crystals previously formed will absorb water from the mother liquor and be converted to the dihydrate also. The actual course of the cooling and crystallization in the case of the mixture represented by point X is indicated on the chart by drawing a line from the $Ca(ClO_3)_2$ vertex through point X to intersect with the solubility curve for about 60° at about point Y, and then extending the 60° solubility curve to point Z where it intersects line EH. In cooling the hot solution to about 60° C., the anhydrous calcium chlorate crystals will be precipitated, while the composition of the solution changes along line XY. At point Y hydration of the anhydrous crystals occurs, while the solution composition changes along line YZ. From point Z further cooling to 30° C. is accompanied by precipitation of dihydrate crystals, and the solution composition changes along line ZE. The net result, however, is the same as though the crystallization were represented as taking place with precipitation of dihydrate crystals and change of composition of the mother liquor continuously along the line XE.

The dihydrate crystals are readily separated from the mother liquor by filtration, and may be washed substantially free of adhering mother liquor with a little water, being thus obtained in relatively pure condition.

The foregoing method is adapted for separating calcium chlorate by crystallizing as the dihydrate, $Ca(ClO_3)_2.2H_2O$, from any mixture thereof with calcium chloride in which the molecular ratio of $CaCl_2$ to $Ca(ClO_3)_2$ is less than about $$\frac{2}{1},$$

if the crystallization is conducted at a temperature of about 30° C. or lower. Most advantageously, however, the method is adapted for crystallizing $Ca(ClO_3)_2.2H_2O$ from mixtures in which the aforesaid ratio is less than about $$\frac{1}{1},$$

in which case the crystallization may be carried out at any temperature below about 60° C.

In the case of solid mixtures of the two salts, the same will be dissolved in a suitable amount of water and crystallized at a temperature below about 60° C. A more dilute solution of the salts, naturally, will be suitably concentrated by evaporation and then cooled to a temperature below 60° C. to crystallize the hydrated calcium chlorate. The temperature of 30° C. shown by way of illustration is convenient to use in large scale operation, as it may ordinarily be attained by employing natural cooling means, such as water. The cooling may be carried to materially lower temperatures, e. g. 20° C. or lower, by the use of refrigeration with ice or by artificial means, however, and with a somewhat larger yield of purified chlorate crystals. The mother liquor separated from the crystals may advantageously be worked up according to, or in connection with, the method described in my Patent 1,887,809.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of separating calcium chlorate from a solution thereof containing calcium chloride which comprises crystallizing the former at a temperature below 60° C. as the dihydrate, $Ca(ClO_3)_2.2H_2O$, from such solution which is saturated with respect to said dihydrate but unsaturated with respect to calcium chloride.

2. The method of separating calcium chlorate from a solution thereof containing calcium chloride which comprises crystallizing the former at a temperature below 60° C. as the dihydrate, $Ca(ClO_3)_2.2H_2O$, from such solution in which the molecular ratio of chloride to chlorate is less than $$\frac{1}{1}.$$

3. The method of separating calcium chlorate from a solution thereof containing calcium chloride which comprises crystallizing the former at a temperature of about 30° C. as the dihydrate, $Ca(ClO_3)_2.2H_2O$, from such solution in which the molecular ratio of chloride to chlorate is less than $$\frac{2}{1}.$$

4. The method of separating calcium chlorate from a solution thereof containing calcium chloride wherein the molecular ratio of chloride to chlorate is less than $$\frac{1}{1},$$

which comprises concentrating such solution to saturation with respect to said chlorate at a temperature below 60° C., and cooling to a temperature below 60° C. to crystallize the chlorate as $Ca(ClO_3)_2.2H_2O$.

5. The method of purifying calcium chlorate from a small amount of calcium chloride which comprises dissolving the impure chlorate in water to form a solution saturated with respect to $Ca(ClO_3)_2.2H_2O$ but unsaturated with respect to calcium chloride at a temperature below 60° C., and crystallizing said chlorate as the dihydrate thereof by cooling to a temperature below 60° C.

6. The method of purifying calcium chlorate from a small amount of calcium chloride which comprises dissolving the impure chlorate in water to form a solution in which the ratio of chloride to chlorate is less than $$\frac{1}{1},$$

concentrating to saturation with respect to $Ca(ClO_3)_2.2H_2O$ at a temperature below 60° C., and crystallizing said chlorate as the dihydrate thereof by cooling to such temperature below 60° C.

7. The method of purifying calcium chlorate from a small amount of calcium chloride which comprises dissolving the impure chlorate in water to form a solution in which the ratio of chloride to chlorate is less than $$\frac{2}{1},$$

concentrating to saturation with respect to $Ca(ClO_3)_2.2H_2O$ at a temperature below about 30° C., and crystallizing said chlorate as the dihydrate thereof by cooling to such temperature below 30° C.

8. The method of purifying calcium chlorate from a small amount of calcium chloride which comprises preparing a solution of such impure chlorate saturated with respect to $Ca(ClO_3)_2.2H_2O$ at a temperature below 60° C., cooling to crystallize said chlorate as the dihydrate thereof, and separating the crystals from the mother liquor.

SHELDON B. HEATH.